US010674562B2

(12) United States Patent
Clegg et al.

(10) Patent No.: US 10,674,562 B2
(45) Date of Patent: *Jun. 2, 2020

(54) SYSTEM AND METHOD FOR BRIDGING TO A LTE WIRELESS COMMUNICATION NETWORK

(71) Applicant: NETGEAR, Inc., San Jose, CA (US)

(72) Inventors: Michael Clegg, San Jose, CA (US); Robert MacKinnon, San Jose, CA (US)

(73) Assignee: NETGEAR, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/102,550

(22) Filed: Aug. 13, 2018

(65) Prior Publication Data
US 2018/0352605 A1    Dec. 6, 2018

Related U.S. Application Data

(63) Continuation of application No. 15/692,170, filed on Aug. 31, 2017, now Pat. No. 10,057,941, which is a
(Continued)

(51) Int. Cl.
*H04W 84/10* (2009.01)
*H04L 12/46* (2006.01)
(Continued)

(52) U.S. Cl.
CPC ....... *H04W 84/105* (2013.01); *H04L 12/4625* (2013.01); *H04L 69/18* (2013.01); *H04W 88/10* (2013.01); *H04W 92/20* (2013.01)

(58) Field of Classification Search
CPC ... H04W 84/105; H04W 88/10; H04W 92/20; H04L 12/4625; H04L 69/18
See application file for complete search history.

(56) References Cited

U.S. PATENT DOCUMENTS 8,085,802 B1    12/2011  Monk et al.
9,220,128 B2 *  12/2015  Clegg ................. H04W 84/105
(Continued)

FOREIGN PATENT DOCUMENTS

CN         1108450 A      9/1995
CN       201290161 Y      8/2009
CN       101562553 A     10/2009

OTHER PUBLICATIONS

Extended Search Report issued for European Patent Applicaiton No. 12170540.4, dated Oct. 8, 2013, 7 pages.
(Continued)

*Primary Examiner* — Nguyen T Vo
(74) *Attorney, Agent, or Firm* — Norton Rose Fulbright US LLP

(57) ABSTRACT

A system and method for bridging user devices communicating according to a $3^{rd}$ Generation (3G) communication protocol to a LTE wireless communication network, thereby enabling user devices that do not have sufficient signal strength for directly coupling to the LTE wireless communication network to nevertheless access such wireless communication systems and methods via a bridging system.

24 Claims, 3 Drawing Sheets

Related U.S. Application Data continuation of application No. 15/376,090, filed on Dec. 12, 2016, now Pat. No. 9,794,982, which is a continuation of application No. 14/958,758, filed on Dec. 3, 2015, now Pat. No. 9,560,691, which is a continuation of application No. 13/223,832, filed on Sep. 1, 2011, now Pat. No. 9,220,128.

(51) Int. Cl.
*H04L 29/06* (2006.01)
*H04W 88/10* (2009.01)
*H04W 92/20* (2009.01)

(56) References Cited

U.S. PATENT DOCUMENTS

| | | | | |
|---|---|---|---|---|
| 9,560,691 | B2* | 1/2017 | Clegg | H04W 84/105 |
| 9,794,982 | B2* | 10/2017 | Clegg | H04W 84/105 |
| 10,057,941 | B2* | 8/2018 | Clegg | H04W 84/105 |
| 2002/0146980 | A1 | 10/2002 | Solondz et al. | |
| 2003/0112810 | A1 | 6/2003 | Nakabayashi et al. | |
| 2003/0185168 | A1 | 10/2003 | Tung | |
| 2005/0207403 | A1 | 9/2005 | Katayama et al. | |
| 2007/0060133 | A1 | 3/2007 | Spitzer et al. | |
| 2007/0237094 | A1 | 10/2007 | Bi et al. | |
| 2009/0247070 | A1 | 10/2009 | Baraz et al. | |
| 2009/0262715 | A1 | 10/2009 | Juang | |
| 2010/0165957 | A1 | 7/2010 | Hedge et al. | |
| 2010/0322287 | A1 | 12/2010 | Truong et al. | |
| 2011/0300850 | A1 | 12/2011 | Kuo et al. | |
| 2012/0039253 | A1 | 2/2012 | Wang et al. | |
| 2012/0082150 | A1 | 4/2012 | Ozawa | |
| 2012/0264367 | A1 | 10/2012 | Aguirre et al. | |

OTHER PUBLICATIONS

First Examination Report issued for European Patent Application No. 12170540.4, dated Oct. 10, 2014, 6 paas.

Daniel T Fokum et al., "A Survey on Methods for Broadband Internet Access on Trains", IEEE Communications Surverys, IEEE, New York, NY, US, vol. 12, No. 2, Apr. 1, 2010, pp. 171-185.

Office Action issued for Chinese Patent Application No. 201210301138.6, dated Jan. 24, 2018; 14 pages with English translation.

Office Action issued for Chinese Patent Application No. 201210301138.6, dated Jul. 28, 2017; 20 pages with English translation.

\* cited by examiner

SYSTEM AND METHOD FOR BRIDGING TO A LTE WIRELESS COMMUNICATION NETWORK

CROSS-REFERENCE TO RELATED APPLICATIONS

This application is a continuation of U.S. patent application Ser. No. 15/692,170, filed Aug. 31, 2017, that issued Aug. 21, 2018, as U.S. Pat. No. 10,057,941, and entitled "SYSTEM AND METHOD FOR BRIDGING TO A LTE WIRELESS COMMUNICATION NETWORK"; which is a continuation of U.S. patent application Ser. No. 15/376,090, filed Dec. 12, 2016, that issued Oct. 17, 2017, as U.S. Pat. No. 9,794,982, and entitled "SYSTEM AND METHOD FOR BRIDGING TO A LTE WIRELESS COMMUNICATION NETWORK"; which is a continuation of U.S. patent application Ser. No. 14/958,758, filed Dec. 3, 2015, that issued as U.S. Pat. No. 9,560,691 on Jan. 31, 2017, and entitled "SYSTEM AND METHOD FOR BRIDGING TO A LTE WIRELESS COMMUNICATION NETWORK", which is a continuation of U.S. application Ser. No. 13/223,832, filed Sep. 1, 2011, that issued as U.S. Pat. No. 9,220,128 on Dec. 22, 2015, and entitled "SYSTEM AND METHOD FOR BRIDGING TO A LTE WIRELESS COMMUNICATION NETWORK"; the disclosures of which are herein incorporated in their entirety.

TECHNICAL FIELD

The following description relates generally to wireless communication systems and methods, and more particularly to systems and methods for bridging to a wireless communication network, thereby enabling user devices that do not have sufficient signal strength to directly couple to the wireless communication network to nevertheless access such wireless communication systems and methods via a bridging system.

BACKGROUND

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or "node Bs" that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. Packets that a UE desires to transmit are queued up at the UE, and the base station makes decisions regarding when the UE should be scheduled for uplink transmission and how many resources to assign it.

Thus, mobile (e.g., cellular) telephones have traditionally communicated over a network of specialized base stations. Most current mobile telephones connect to a cellular network of base stations, which may in turn be interconnected to the public switched telephone network (PSTN). In some cases, where data packets are supported by the wireless communication protocol, the cellular network of base stations may be communicatively coupled (e.g., via one or more gateway devices) with a data packet network, such as the Internet, thereby enabling UEs (e.g., mobile telephones) to browse the web and/or perform other data packet transactions (e.g., receive and/or transmit data packets) with other devices, such as computer servers. The base stations (or "cellular towers") generally provide coverage over large areas. The area coverage of such a tower is sometimes referred to as a macrocell. These base stations are typically positioned to bring the greatest coverage to the greatest number of cellular telephone users. The above-described traditional cellular telephone network is referred to herein as a "mobile core network" (or simply "mobile core").

Thus, cellular networks such as those described above are referred to herein as a "mobile core network" (or simply "mobile core"). It should be appreciated that, although terms typically associated with particular network standards and protocols have been used in describing exemplary mobile core networks above, mobile core networks as discussed herein may comprise various configurations, such as GSM, CDMA, time division multiple access (TDMA), UMTS, second generation (2G), third generation (3G), high speed packet access (HSPA), time division-synchronous code division multiple access (TD-SCDMA), time division-code division multiple access (TD-CDMA), etc. The makeup and functionality of these and other mobile core networks is well-known in the art and is thus not described in great detail herein.

A mobile core network may be formed using any of various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2).

In the traditional cellular telephone network (or "mobile core" described above), the coverage of the macrocell base stations is not uniform. For example, individual buildings may have weak signals indoors. Accordingly, more recently the addition of wireless router femtocell base stations has evolved. A femtocell is sometimes referred to as a "home base station", "access point base station", "3G access point", "small cellular base station" and "personal 2G-3G base station". In general, a femtocell is a small cellular base station designed for use in residential or small business environments. It connects to the service provider's network via broadband (such as DSL or cable) and typically supports 2 to 5 wireless communication devices (e.g., telephones) in a residential setting. A femtocell allows service providers to extend service coverage within a targeted small geographic location, such as within a user's home or business—especially where access would otherwise be limited or unavailable—without the need for expensive cellular towers.

A femtocell may thus be deployed directly within the wireless subscriber's premises, such as at a home or office. With a conventional femtocell, the wireless communication device (e.g., cellular telephone) accesses the femtocell base station through traditional licensed spectrum, and the handset connects to the femtocell via a radio link that implements traditional mobile network standards. The power levels between the femtocell and the attached mobile user equipment (UE) are generally much lower than the power levels between a macrocellular base transceiver station (BTS) and UE, since the limited range of the femtocell is intended to cover a much smaller geographical area (e.g., the subscriber's premises).

In most femtocell designs, connectivity to the mobile network or public switched telephone network (PSTN) is provided through an Internet connection, and calls are connected through Voice over Internet Protocol (VoIP) technologies. Other techniques are possible, such as utilizing a Bluetooth connection between the mobile user equipment (e.g., handset) and a personal computer or peripheral, as implemented in the Glide product from British Telecom (BT). In general, mobile operators are currently focusing on the UMA and femtocell approaches.

Generally, the femtocell incorporates the functionality of a typical base station but extends it to allow a simpler, self-contained deployment. For example, a UMTS femtocell may be implemented containing a Node B, RNC and GSN with Ethernet for backhaul. Although much attention is focused in the industry on UMTS, the femtocell concept is applicable to all standards, including GSM, CDMA2000, TD-SCDMA and WiMAX solutions.

For the mobile user, the attractions of a femtocell are improvements to both coverage and capacity, especially indoors. Femtocells offer an alternative way to deliver the benefits of Fixed Mobile Convergence (FMC). The distinction is that most FMC architectures require a new (dual-mode) handset which works with existing home/enterprise Wi-Fi access points, while a femtocell-based deployment will work with existing handsets with an installation of a new access point.

Currently, there are two broad femtocell architecture approaches within a mobile service provider's network: 1) all-IP (SIP/IMS) based approach, and 2) IP RAN based approach. The SIP/IMS based approach integrates the femtocell through a SIP or IMS based network. This approach leverages a SIP based (voice over IP) VoIP network for cost-effective delivery, while interworking with a cellular core to extend legacy circuit switched services. In this approach, the customer premise equipment (CPE) converts cellular signals to SIP and interfaces to a SIP-MSC interworking function (IWF) which connects to the SIP (or IMS) network as well as the circuit-switched network.

The IP RAN based approach effectively considers a femtocell an extension into the operator RAN network and ties the femtocell into the circuit-switch core at the edge of the network. This typically involves transporting "Iub" messages over IP into a Radio Network Controller (RNC) or a modified RNC/concentrator. (The Iub is the interface used by an RNC to control multiple Node B's in a UMTS network.)

BRIEF SUMMARY

Embodiments of the present invention relate generally to wireless communication systems and methods, and more particularly to systems and methods for bridging to a wireless communication network, thereby enabling user devices that do not have sufficient signal strength for directly coupling to the wireless communication network to nevertheless access such wireless communication systems and methods via a bridging system.

A "catch-22" situation often arises with the deployment of new wireless communication protocols (e.g., standards). On the one hand there is a need for wide-spread deployment of macro base stations to build out the coverage of the wireless network to encourage adoption of the technology by end users. For instance, end users will not want to invest in service and devices capable of using the new wireless communication protocol if there is not sufficient coverage to enable the user's to utilize it. On the other hand, service providers often do not fully build out coverage of a new communication network at the outset, but instead gradually build out the network as users adopt the new technology. For instance, service providers may initially focus on implementing base stations to provide coverage to highly-populated urban areas, while much less coverage is often provided initially to less populated rural areas.

Accordingly, particularly as a new wireless communication protocol is deployed and before it gains sufficient macro base station deployment within the mobile core network to provide wide geographic coverage, a need may arise to provide a solution for extending use of the new wireless communication protocol to areas where such coverage is not strong.

One example of such a newly-developed communication protocol that is currently being experienced is the transition from 3G to LTE or LTE Advanced ("LTE-A"), together referred to in the alternative herein as "LTE/-A". In general, LTE/-A systems employ heterogeneous base stations throughout the mobile core network, where such heterogeneous base stations have different power classes. Further, as discussed further herein, in LTE/-A systems the heterogeneous base stations operate in a coordinated fashion to minimize interference or noise experienced by the UEs. Any wireless communication system having these characteristics of the LTE/-A system are generally referred to herein as an "LTE-based system." That is, as used herein, "LTE-based system" refers generally to any wireless communication system having heterogeneous base stations (of differing power classes) that operate in a coordinated fashion to perform resource coordination and coordination of interference management (e.g., to minimize interference or noise experienced by the UEs), while "LTE/-A" is used herein to refer more specifically to the LTE or LTE Advanced (LTE-A) standards. Clearly, LTE/-A provides an example of a LTE-based system, but other wireless communication standards may similarly possess the above-mentioned characteristics to be considered LTE-based systems, as well.

LTE/-A offers many benefits as a technology over 3G—higher throughput, lower latency and a lot of carriers now have a deployment strategy for LTE/-A from frequency bands with a lower 700-800 megahertz band, which may be employed for coverage of rural areas, through to 2600 megahertz band, which may be employed for high-capacity urban areas. During the initial transition phase, a lot of operators will have problems covering the entire geographic areas that they want to service with the LTE/-A technology. Therefore, a desire arises for a solution that aids in getting this new service into consumers' homes that might otherwise have no or unsatisfactory service coverage.

In addition, LTE/-A brings forward many new or different types of applications for the consumers than were supported by 3G. For instance, there is more of a focus on "fixed" wireless technology in LTE/-A because it provides higher throughput, has a higher capacity, and therefore enables users to do many more applications in their home, whereas 3G was primarily focused on getting more bandwidth (for email, etc.) for the user's mobile handset. So, while 3G provided a communication protocol directed primarily for mobile users, LTE/-A affords a communication platform that may be leveraged for supporting a variety of applications at a fixed geographic location, such as within a user's home or business location. Thus, for instance, LTE/-A may be leveraged to provide the user's home telephony connection, home Internet connection, online gaming applications, and a variety of other communication applications within a user's home. Accordingly, while LTE/-A provides a mobile communication protocol that enables communication for mobile wireless devices, such as cellular telephones, etc., LTE/-A could potentially be leveraged to provide all (or most) of the communication for a user's home or business, thereby potentially eliminating a separate land-based telephone line/service and a separate Internet provider service (e.g., DSL, cable, or other Internet access service) in favor of using LTE/-A for all such communication.

According to one embodiment of the present invention, a bridge system is provided for enabling one or more user devices within a building to communicatively couple with a LTE-based wireless communication network. The user devices may have insufficient signal strength within the building to be able to directly couple with the LTE-based wireless communication network (without use of the bridge system). The bridge system includes an external module for arrangement external to a building for communicatively coupling with the LTE-based wireless communication network, and an internal module for arrangement within the building for communicatively coupling via a different interface with the user device(s). The different interface provided between the internal module and the user devices is different from that between the external module and the LTE-based wireless communication network. For instance, the different interface between the internal module and the user devices may be a short-range air interface (e.g., WiFi interface), a different long-range air interface (e.g., 3G-based wireless communication), or a wired interface (e.g., a USB interface or Ethernet interface). A communication coupling is provided between the external module and the internal module for enabling communication between the user device(s) and the LTE-based wireless communication network. Such communication coupling may be a wired coupling, which may employ Ethernet-based communication over a Cat5 cable, as one example.

The communication received from the LTE-based wireless communication network at the external module may be converted to a different protocol, which is then communicated via the communication coupling with the internal module to the internal module, and then communicated to the user device(s) via the different interface. Similarly, communication received from the user devices via the different interface at the internal module may be converted to a different protocol, which is then communicated via the communication coupling with the external module to the external module, and then transmitted by the external module over the LTE-based wireless communication network.

The external module may comprise an antenna, receiver, transmitter, wired interface for coupling with the internal module, and a converter for converting between the LTE-based wireless communication and wired communication coupling with the internal module. In certain embodiments, the external module is configured to optimize the communicative coupling with the LTE-based wireless communication network. For instance, an installation tool may be employed to aid in arranging the external module, directing its antenna(s), and/or otherwise configuring it to optimize its coupling with the LTE-based wireless communication network.

The internal module may comprise a wired interface for coupling with the external module, wired interface for coupling with a router device, and converter for converting between the communication coupling with the external device and the communication coupling with the router device. Further, in certain embodiments, the router device is not natively configured to couple to and operate with the LTE-based wireless communication network or the internal module and external module. The router device may provide the different interface for interfacing with the user device(s), such as a short-range air interface, a different long-range air interface (e.g., 3G communication), and/or wired interface. For example, in one embodiment, the router device comprises a wired interface for coupling with the internal module, receiver, transmitter, and at least one of short-range air interface, a different long-range air interface (e.g., 3G communication), and wired interface for providing the different interface for coupling with the user device(s). In certain embodiments, the internal module further comprises a power injector for transmitting power to the external module via the wired interface with the external module.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The word "exemplary" is used herein to mean "serving as an example, instance, or illustration." Any embodiment described herein as "exemplary" is not necessarily to be construed as preferred or advantageous over other embodiments.

Figure 1:
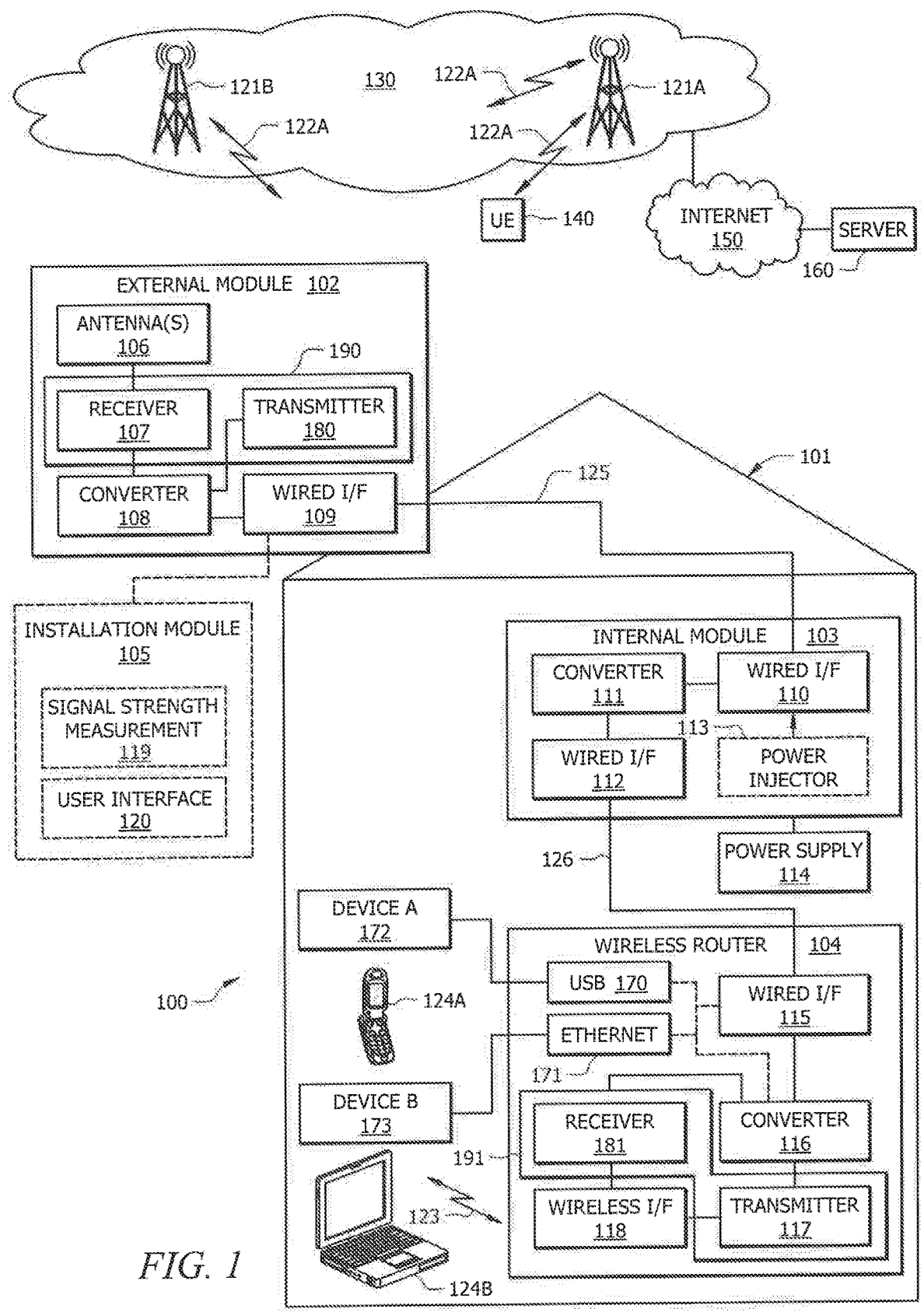
FIG. 1 shows an exemplary bridging system in accordance with one embodiment of the present invention.

FIG. 1 shows an exemplary system 100 in accordance with one embodiment of the present invention. System 100 includes a wireless network 130 for communication, which may be an Long Term Evolution LTE/-A network or other LTE-based system, for example. The wireless network 130 includes a number of base stations, such as base stations 121A and 121B, which may be referred to as macro base stations, access points, node Bs, or evolved node Bs (eNBs). Wireless network 130 may further include various other network entities, such as relay stations, gateways, routers, controllers, switches, and/or other devices that may be implemented in forming a wireless communication network infrastructure, which are not shown as to avoid unnecessarily detracting from other aspects of focus in system 100. While two base stations 121A and 121B are shown for ease of illustration in FIG. 1, it will be understood that any number of such base stations may be deployed for forming wireless communication system 130, and such base stations are referred to collectively herein as base stations 121.

Base stations 121 may be stations that communicate with each other and/or with UEs, such as UE 140, and each base station 121 may provide communication coverage for a particular geographic area. In 3GPP, the term "cell" can refer to this particular geographic coverage area of an eNB and/or an eNB subsystem serving the coverage area, depending on the context in which the term is used. In addition, wireless communication network 130 may communicatively couple with other networks, such as a data network (e.g., Internet 150), a public-switched telephone network (PSTN), etc.

Base stations 121 may each provide communication coverage for a macro cell, which may generally cover a relatively large geographic area (e.g., several kilometers in radius) and may allow unrestricted access by UEs with service subscriptions with the network provider. In the illustrated example, base stations 121 within wireless communication network 130 enable wireless communication according to a certain wireless communication protocol (or "standard"). For instance, wireless communication according to LTE/-A may be supported by base stations 121A/121B for their respective coverage areas, shown generally as wireless communication 122A and 122B, respectively.

In general, LTE/-A systems employ heterogeneous base stations 121 throughout the mobile core network 130, where such heterogeneous base stations have different power classes. Also, as discussed further herein, in LTE/-A systems the heterogeneous base stations operate in a coordinated fashion to perform resource coordination and coordination of interference management (e.g., to minimize interference or noise experienced by the UEs).

For instance, in LTE/-A, a base station (or "eNB") 121 may provide communication coverage for a macro cell, a pico cell, a femtocell, and/or other types of cell. A macro cell generally covers a relatively large geographic area (e.g., several kilometers in radius) and may allow unrestricted access by UEs, such as UE 140, with service subscriptions with the network provider. A pico cell would generally cover a relatively smaller geographic area and may allow unrestricted access by UEs, such as UE 140, with service subscriptions with the network provider. A femtocell would also generally cover a relatively small geographic area (e.g., a home) and, in addition to unrestricted access, may also provide restricted access by UEs having an association with the femtocell (e.g., UEs in a closed subscriber group (CSG), UEs for users in the home, and the like).

An eNB 121 for a macro cell may be referred to as a macro eNB. An eNB 121 for a pico cell may be referred to as a pico eNB. And, an eNB 121 for a femtocell may be referred to as a femto eNB or a home eNB. Network 130 may include any number of such heterogeneous eNBs 121. An eNB 121 may support one or multiple (e.g., two, three, four, and the like) cells. Further, a network controller within network 130 may couple to a set of eNBs 121 and provide coordination and control for these eNBs. The network controller may communicate with the eNBs 121 via a backhaul. The eNBs 121 may also communicate with one another, e.g., directly or indirectly via a wireless backhaul or a wireline backhaul.

The UEs, such as UE 140, are dispersed throughout the wireless network 130, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, or the like. A UE may be able to communicate with macro eNBs, pico eNBs, femto eNBs, relays, and the like.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

A UE, such as UE 140, may be within the coverage of multiple eNBs 121. One of these eNBs, such as eNB 121A, may be selected to serve the UE 140. The serving eNB may be selected based on various criteria such as received power, path loss, signal-to-noise ratio (SNR), etc.

Thus, heterogeneous networks, like network 130, may have eNBs 121 of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Thus, the wireless network 130 may use a diverse set of eNBs 121 (i.e., macro eNBs, pico eNBs, femto eNBs, and relays) to improve the spectral efficiency of the system per unit area. Because the wireless network 130 uses such different eNBs 121 for its spectral coverage, it may also be referred to as a "heterogeneous network." The macro eNBs are usually carefully planned and placed by the provider of the wireless network 130. The macro eNBs generally transmit at high power levels (e.g., 5 W-40 W). The pico eNBs 121 and the relay stations, which generally transmit at substantially lower power levels (e.g., 100 mW-2 W), may be deployed in a relatively unplanned manner to eliminate coverage holes in the coverage area provided by the macro eNBs and improve capacity in the hot spots. The femto eNBs 121, which are typically deployed independently from the wireless network 130 may, nonetheless, be incorporated into the coverage area of the wireless network 130 either as a potential access point to the wireless network 130, if authorized by their administrator(s), or at least as an active and aware eNB that may communicate with the other eNBs 121 of the wireless network 130 to perform resource coordination and coordination of interference management. The femto eNBs typically also transmit at substantially lower power levels (e.g., 100 mW-2 W) than the macro eNBs.

In operation of a heterogeneous network, such as the wireless network 130, each UE (e.g., UE 140) is usually served by the eNB 121 with the better signal quality, while the unwanted signals received from the other eNBs 121 are treated as interference. While such operational principals can lead to significantly sub-optimal performance, gains in network performance are realized in the wireless network 130 by using intelligent resource coordination among the eNBs 121, better server selection strategies, and more advanced techniques for efficient interference management.

A pico eNB 121 is characterized by a substantially lower transmit power when compared with a macro eNB 121. A pico eNB 121 will also usually be placed around a network 130 in an ad hoc manner. Because of this unplanned deployment, wireless networks with pico eNB placements can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs and the pico eNBs implies that, in a mixed deployment, the downlink coverage area of the pico eNB will be much smaller than that of the macro eNBs.

Even with the deployment of various macro, pico, and/or femto eNBs 121 for forming wireless communication network 130, coverage within a building 101, particularly in certain rural geographic locations, may be unsatisfactory and may be insufficient to enable communication devices (which may be referred to as UEs), such as devices 124A, 124B, 172, and 173 shown in the example of FIG. 1, to communicate via the wireless network 130. In accordance with embodiments of the present invention, an external module 102 and an internal module 103 are employed at a building 101 (e.g., a home, business, or other fixed building) to enable the wireless communication system 130 to be leveraged for a user within the building 101 who might otherwise have insufficient signal strength for accessing wireless communication network 130 from within building 101. For instance, a user within such building 101 may employ wireless devices, such as devices 124A and/or 124B, to communicate via wireless communication system 130 with another UE 140 (e.g., to conduct voice communication, text messaging, etc.). As another example, a user within such building 101 may employ wireless devices, such as devices 124A and/or 124B, to access via wireless communication system 130 Internet 150 for communicating with a computer server device 160 (e.g., a web server hosting web pages, etc.), for instance. As still another example, in certain embodiments a user may employ wired devices 172 and/or 173 which may be communicatively coupled via an Ethernet interface 171, USB interface 170, or other wired interface for communicating over wireless communication network 130.

As discussed above, where coverage of the wireless communication system 130 is strong, a user may be able to directly access such system 130. For instance, in a highly-populated urban area where many base stations 121 may be employed, strong wireless coverage may be provided to enable users to have adequate signal strength within their homes/businesses to directly access such wireless communication system 130. However, in some cases individual buildings may have weak wireless signals indoors. For instance, in rural areas, a sufficient number of base stations may not be deployed to provide strong signal strength for indoor access within building 101. As mentioned above, this is often the case particularly when relatively new wireless communication protocols/technologies are released, such as is currently the case with LTE/-A, as they are often focused initially on covering highly-populated urban areas rather than rural areas. Even within urban areas or areas where wireless network 130 has been built out with a relatively large number of base stations 121, the materials from which the building 101 is constructed may interfere with the wireless signal, thereby preventing a strong wireless signal between wireless communication network 130 and the inside of building 101.

In the illustrated example of FIG. 1, an external module 102 is implemented on the outside of building 101 for establishing a wireless communication connection with wireless communication network 130. Such external module 102 is configured to optimally form a relatively strong wireless communication coupling with wireless communication network 130. For instance, antenna(s) 106 may be directionally oriented and/or otherwise configured for optimal coupling with wireless communication network 130.

Also, an internal module 103 is implemented within building 101. A wired coupling 125 is provided between external module 102 and internal module 103 via which communication between the external module 102 and internal module 103 can flow. For instance, communication of information received by external module 102 from communication network 130 (e.g., as may be communicated from UE 140 or server 160) can be passed via wired coupling 125 to internal module 103, and then from internal module 103 the information may be communicated to one or more recipient user devices within building 101, such as devices 124A, 124B, 172, and/or 173, as discussed further hereafter. Similarly, communication of information from one or more recipient user devices within building 101, such as devices 124A, 124B, 172, and/or 173, may be received by internal module 103 and passed via wired coupling 125 to external module 102, and then from external module 102 the information may be transmitted to one or more recipient devices, such as UE 140 or server 160, via wireless communication network 130, as discussed further hereafter. Thus, the external module 102 and internal module 103 enable wireless communication devices within building 101, such as devices 124A and 124B, to communicatively access wireless communication network 130, even though signal strength within building 101 may be insufficient to enable those wireless devices to directly access wireless communication network 130 from within building 101 (without the aid of external module 102 and internal module 103 in the manner described further herein). Thus, external module 102 and internal module 103 may effectively comprise a bridge system to enable such devices that would otherwise be incapable of accessing wireless communication network 130 to so access it.

Internal wireless communication 123 may be provided by a wireless router 104, which may, in certain embodiments, provide a short-range air interface (e.g., WiFi communication, WiMAX communication, such as communication in accordance with the IEEE 802.11n specification, IEEE 802.11g, and/or IEEE 802.11b standards), within building 101 via which wireless devices 124A and 124B may communicatively couple (through internal module 103 and external module 102) with wireless communication network 130. Wireless devices 124A and 124B may be any wireless-enabled communication device that is operable to communicate via wireless communication 123 (e.g., a short-range air interface, such as WiFi or WiMAX), such as a mobile telephone, personal data assistant (PDA), laptop computer, notebook computer, pad computer, media player device, gaming device, etc. Accordingly, wireless communication over 123 may include OFDMA, CDMA, SDMA, and/or TDMA modulation schemes. While two such wireless user devices are shown in this example, it should be appreciated that any number thereof may be implemented in accordance with embodiments of the present invention.

In certain embodiments, wireless router 104 may provide a long-range air interface. For instance, in certain embodiments, wireless router 104 may be a 3G femtocell unit, wherein the air interface 123 for the wireless devices 124A and 124B within building 101 may be wireless RF communication according to the 3G standard. In such an embodiment, the wireless router 104 and/or internal module 103 convert between the 3G air interface and the communication protocol used for communication with the external module 102. For instance, wireless router 104 may convert between 3G communication 123 and the wired coupling (e.g., Ethernet interface) employed between such wireless router 104 and internal module 103, and external module 102 in turn provides the conversion between the wired coupling (e.g., Ethernet interface) and LTE for interfacing with the LTE backhaul.

In the example of FIG. 1, a wireless router device 104 is provided within building 101, which is coupled via wired coupling 126 with internal module 103. Wireless router device 104 may be a conventional wireless router device, such as those provided by NETGEAR, in certain embodiments. As discussed hereafter with FIG. 2, in certain embodiments, internal module 103 may be implemented to include the wireless routing functionality of wireless router 104, thereby eliminating the need for a separate wireless router device 104 to be implemented within building 101. Additionally, in certain embodiments internal wired interface(s) may be provided (e.g., wireless router 104), such as the USB interface 170 and Ethernet interface 171, within building 101 via which devices, like devices 172 and 173, may communicatively couple (through internal module 103 and external module 102) with wireless communication network 130. User devices 172 and 173 may be any type of communication devices that communicatively couple to router 104 via a wired interface, such as a personal computer (PC), data storage device, laptop computer, media player device, gaming device, etc. While two such user devices 172/173 are shown in this example, it should be appreciated that any number thereof may be implemented in accordance with embodiments of the present invention.

In the illustrated embodiment of FIG. 1, external module 102 includes antenna(s) 106, a receiver 107, a converter 108, a transmitter 180, and a wired interface 109. The components included in external module 102 may be housed within a weatherproof (e.g., rubberized, plastic, metal, etc.) housing, which may be mounted to building 101. The antenna(s) 106 operate in a conventional manner to receive wireless RF signals from wireless communication network 130. The antenna design may be a standard directional antenna system, which is most cost effective, or it may be an omni-directional antenna system, which may be configured to pick up multiple base stations from multiple areas of network 130, as examples. In some cases, both a directional and omni-directional antenna(s) may be employed within external module 102. The antenna(s) 106 may be implemented within the module's housing or external thereto. The arrangement of the antenna(s) 106 may depend at least in part on the material of the housing (e.g., whether it is a housing that does not substantially block or interfere with the wireless signals, such as plastic, or one that does substantially block or interfere with the signals, such as metal). As discussed further herein, during installation of external module 102 at building 101, the location and position at which external module 102 is placed on building 101 and/or the direction/configuration of the antenna(s) 106 may be selectively configured to optimize (e.g., maximize) the strength of wireless communicative coupling with the wireless communication network 130.

Receiver 107 receives the signals from antenna(s) 106, and may comprise logic for processing the received signals in some way, such as electronic filters to separate a wanted signal from all other interference or "noise" signals picked up by the antenna(s) 106, amplifier(s) to amplify the received signal to a level suitable for further processing, and demodulation and/or decoding logic for decoding the signal into a form usable for the consumer, such as sound, pictures, digital data, measurement values, etc. For example, in one embodiment, the receiver 107 may be any suitable receiver for receiving LTE/-A communication. For instance, receiver 107 of external module 102 may effectively comprise an LTE/-A modem that is comprised of any number of different chipset solutions and frequency bands for performing that function.

In the embodiment of FIG. 1, converter 108 further converts the output signal from receiver 107 into a communication protocol to be used for communicating the information via wired coupling 125 to internal module 103. According to the depicted embodiment, the LTE data communication protocol is converted to a different protocol for communicating payload data over wired coupling 125 between external module 102 and internal module 103, i.e., as data is communicated between network 130 and the user devices. This same protocol can be used in communicating data between the indoor unit and the end user devices.

In one embodiment, all communication between external module 102 and internal module 103 occurs via a single wired coupling 125 (e.g., a single cable, like a CAT5 cable). Further, in certain embodiments, power is also transferred from internal module 103 to external module 102 (for powering external module 102) via the single wired coupling 125. In one embodiment, wired interface 109 is an Ethernet port, and wired coupling 125 is an Ethernet coupling. A suitable cable, such as a Cat5 cable with RJ45 connectors, may be used for forming the single wired coupling 125 between the external module 102 and internal module 103. That is, the Cat5 cable may be the physical single wired medium over which the Ethernet standard may be employed for communication. In some embodiments, such single wired coupling (e.g., Cat5 cable carrying Ethernet-based communication) may be used to provide not only payload (e.g., IP) communication between external module 102 and internal module 103, but may also be used for transmitting power (e.g., Power over Ethernet or "PoE" injection) that is injected via power injector 113 from internal module 103 to external module 102. While Ethernet-based communication is employed in one embodiment, in other embodiments the wired interface/coupling between external module 102 and internal module 103 may be of another type, such as USB coupling, FireWire coupling, etc. Similarly, in some implementations a cable other than a Cat5 cable, such as a coaxial cable, may be employed as the physical carrier medium for the wired coupling. The wired coupling 125 preferably supports a lightening arrester and/or other environmental protectors to protect the electronics of external module 102 and internal module 103 from lightening and/or other environmental influences.

In operation, so-called "payload communication" that is transmitted via wireless communication network 130 (e.g., from UE 140 or server 160, as examples) to be received by one or more user devices within building 101 is received by external module 102. The received communication is interpreted by receiver 107 into "received payload information," which may then be converted by converter 108 to a protocol for communication via wired coupling 125 to internal module 103. Such protocol may be an Ethernet-based or other suitable communication protocol for communication via wired coupling 125. In certain embodiments, the communication protocol used between external module 102 and internal module 103 may be a proprietary protocol, which is not a generally open or standard communication protocol. Such proprietary protocol may enable certain features, such as interrogation of the external module 102 by the internal module 103.

Transmitter 180 is an electronic device which, with the aid of antenna(s) 106, produces radio waves for transmitting information to wireless communication network 130. For example, in one embodiment, the transmitter 180 may be any suitable transmitter for transmitting LTE/-A communication. In certain embodiments, communication from devices within building 101 may be communicated from internal module 103 via wired coupling 125 to external module 102. For instance, so-called "payload communication" from one or more of the user devices within building 101 that is destined for a recipient, such as UE 140 or server 160 as examples, is received by external module 102 from internal module 103. Converter 108 may convert the received payload communication from a protocol used for such communication over wired coupling 125 to an appropriate wireless protocol used for communication on wireless communication network 130 (e.g., LTE/-A) and transmitter 180 may then wirelessly transmit the communication to be carried over wireless communication network 130. Thus, external module 102 enables bi-directional communication between wireless communication network 130 and devices within building 101. It should be recognized that while transmitter 180 and receiver 107 are shown as separate blocks in this example for ease of discussion, those components may be implemented as a transceiver 190 in certain embodiments.

In the illustrated embodiment of FIG. 1, internal module 103 includes wired interface 110, converter 111, and wired interface 112. As discussed above, in certain embodiments, wired coupling 125 is a Cat5 cable carrying Ethernet-based communication, and thus the wired interface 110 may be an Ethernet port. In other embodiments, the communication over wired coupling may be according to the implementations, including USB over IP or a proprietary protocol. Converter 111 converts, in this example, the payload communication received from external module 102 by internal module 103 into a communication protocol that is compatible with (or expected by) wireless router 104. If router 104 is compatible with the protocol employed for communication over wired interface 125, then such conversion by converter 111 may be omitted. Wired interface 112 is then used for communicating the converted payload communication via wired coupling 126 to wireless router 104. Such wired interface 112 and wired coupling 126 may be any suitable type of wired interface/coupling supported by wireless router 104, such as an Ethernet coupling, USB coupling, DSL coupling, etc.

In certain embodiments, internal module 103 is powered by power supply 114. For instance, internal module 103 may be coupled to a power socket of building 101 to receive power from the building's power supply 114. Further, in certain embodiments, internal module 103 includes power injector logic 113 for transmitting power via wired coupling 125 to external module 102. For instance, as mentioned above in certain embodiments wired coupling 125 may be a Cat5 cable carrying Ethernet-based communication, where power injector 113 may be a Power over Ethernet ("PoE") injector. In this way, external module 102 may not have or require its own separate power supply or separate coupling to a power supply, but may instead be powered solely by internal module 103, in certain embodiments.

Wireless router 104 is communicatively coupled, via wired coupling 126, with internal module 103. Wireless router 104 provides an interface for devices 124A, 124B, 172, and 173 within building 101, such as a short-range air interface 118 (e.g., WiFi, Bluetooth, etc.), a long-range air interface (e.g., 3G air interface), and/or one or more wired interfaces, like USB interface 170 and Ethernet port 171. In this example, wireless router 104 includes a wired interface 115, converter 116, transmitter 117, receiver 181, and wireless interface 118. Wireless router 104 further includes USB interface 170 and Ethernet interface 171. It should be recognized that while transmitter 117 and receiver 181 are shown as separate blocks in this example for ease of discussion, those components may be implemented as a transceiver 191 in certain embodiments.

Wired interface 115 is a suitable wired interface for coupling with wired coupling 126, such as an Ethernet port in certain embodiments. Converter 116 is configured to convert between the communication protocol used for communication with internal module 103 via the wired coupling 126 and the short-range air interface (e.g., WiFi, Bluetooth, etc.) or long-range air interface (e.g., 3G communication) for wireless communication 123 with devices 124A, 124B.

In operation, payload communication is received from internal module 103 via wired coupling 126 at wireless router 104 (via its interface 115), which may then be converted by converter 116 from wired communication to the short-range or long-range air interface. As discussed below, many wireless routers are known that receive wired communication, e.g., via an Ethernet port from a DSL or cable modem, and convert such communication to short-range or long-range wireless communication 123, and any such techniques may be similarly employed within wireless router 104 in accordance with certain embodiments of the present invention. Transmitter 117 is employed to transmit the short-range or long-range wireless communication 123 via wireless interface 118 to devices 124A and/or 124B.

Similarly, payload communication transmitted from devices 124A and/or 124B via short-range or long-range wireless communication 123 may be received by receiver 181 (via wireless interface 118) of wireless router 104, which may then be converted by converter 116 from the short-range air interface (e.g., WiFi, etc.) or long-range air interface (e.g., 3G communication) to wired communication 126. As discussed below, many wireless routers are known that receive short-range wireless communication from user devices and convert such communication to wired communication 126, such as for communicating via an Ethernet port to a DSL or cable modem, and any such techniques may be similarly employed within wireless router 104 in accordance with certain embodiments of the present invention. Similarly, exemplary wireless routers for providing long-range air interface, such as a 3G femtocell, may be employed for providing the air interface with the wireless UEs within building 101.

Additionally, wireless router 104 may further provide wired interfaces, such as USB port 170 and/or Ethernet port 171, whereby devices 172 and 173 may communicatively couple to wireless network 130 via wireless router 104. Devices 172 and/or 173 may be data storage devices, as one example. As another example, devices 172 and/or 173 may be personal computers (PCs) that couple to wireless network 130 via router 104, internal module 103 and external module 102 for accessing Internet 150 (e.g., for browsing the web and/or conducting transactions with server 160, etc.).

In certain embodiments, wireless router 104 may be a pre-existing or "standard" wireless router that is commercially available, which may be conventionally employed for coupling via Ethernet, DSL, cable, etc. to a network and providing a wireless interface 118 and/or wired interfaces, such as USB 170, Ethernet interface 171 to enable devices 124A, 124B, 172, and 173 to communicatively couple to such network. For instance, such wireless router 104 may not be natively configured to couple to and operate with the wireless communication network 130 or the internal module 103 and external module 102, in certain embodiments. Thus, in certain embodiments, such as that illustrated in the example of FIG. 1, a user's wireless router 104 that may be conventionally employed for coupling to an external network (e.g., the Internet) via a Ethernet connection to a DSL or cable modem, as examples, may instead be used to connect via wired coupling 126 to internal module 103.

As mentioned, in certain embodiments, a proprietary protocol may be employed for communication between external module 102 and internal module 103 (via wired coupling 125). Such proprietary protocol may enable interrogation of the external module 102 for specific information. Also, a graphical user interface may be provided with internal module 103 (which may be a web-based interface that may be accessible via any of user devices 124A, 124B, 172, and 173, for example), which may permit a user to determine the signal strength, quality and also provide a number of test mechanisms that may be initiated to troubleshoot problems and/or improve operation.

In certain embodiments, wireless router 104 and/or internal module 103 may also include logic (e.g., transceiver) for communicatively coupling directly to wireless communication network 130. For instance, wireless router 104 and/or internal module 103 may include logic for implementing a LTE/-A modem, similar to the logic of external module 102 (e.g., the antenna(s), receiver, and transmitter of external module 102). In this way, the internal module 103 and/or wireless router 104 may be a transitional product that enables the user to eliminate the external module 102 at some point if/when wireless communication network 130 has sufficiently strong coverage at building 101 such that communicative coupling can be made from inside building 101. In such an embodiment where the internal module 103 and/or wireless router 104 includes such a LTE/-A modem itself, it may further include logic to monitor the signal strength at such LTE/-A modem and dynamically select between using the external module 102 or the internal module 103/wireless router 104 modem for communicatively coupling to wireless network 130.

During installation of external module 102 at building 101, the location and position at which external module 102 is placed on building 101 and/or the direction/configuration of the antenna(s) 106 may be selectively configured to optimize (e.g., maximize) the strength of wireless communicative coupling with the wireless communication network 130. In certain embodiments, an installation module 105 is provided that may be employed to aid in optimizing the configuration of the external module 102. For instance, installation module 105 may temporarily couple (e.g., via wired interface 109) to external module 102, and signal strength measurement logic 119 may measure the strength of signals being received by external module 102 from wireless network 130. Further, a user interface 120 may output some indication to aid the installer in arranging and/or configuring the external module to optimize such signal strength. Thus, installation tool 105 may couple inline with the connection between the external module and the internal and provide clear information to the installer to aid the installer in determining exactly where to position module 102 and/or to point antenna(s) 106 to optimize signal strength.

Figure 2:
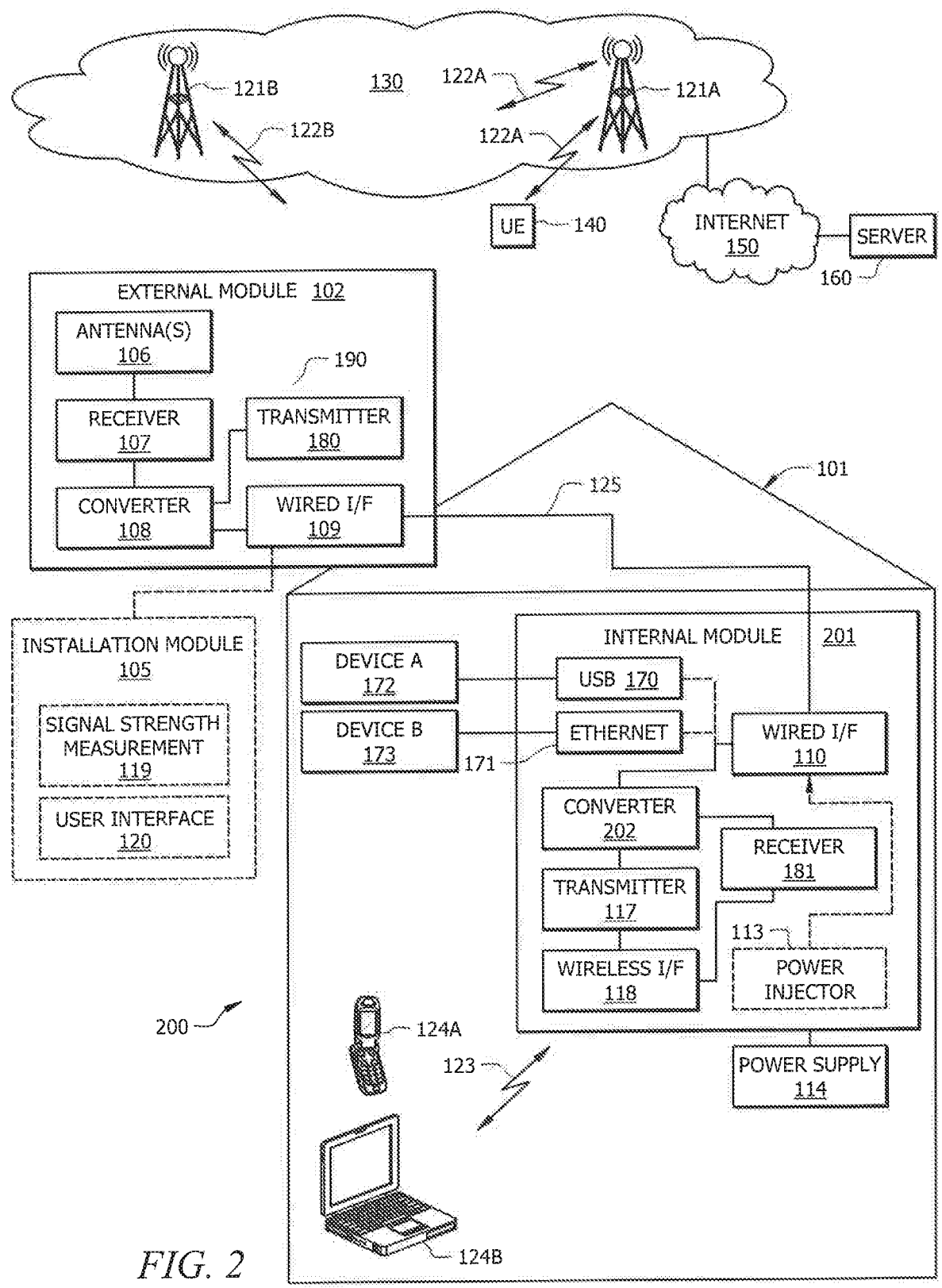
FIG. 2 shows an exemplary bridging system in accordance with another embodiment of the present invention.

Turning to FIG. 2, in certain embodiments, a separate wireless router device 104 may not be required, but instead the internal module 103 may itself be implemented to not only interface with external module 102 but to also provide the internal interface(s), such as a short-range air interface, long-range air interface (e.g., 3G femtocell communication), and/or wired interface (e.g., USB interface, Ethernet port, etc.), for interfacing with user devices 124A, 124B, 172, and 173. In the exemplary system 200 of FIG. 2, internal module 201 includes wired interface 110 for coupling via wired interface 125 with external module 102 in the manner discussed above with FIG. 1. However, in this example, internal module 201 also implements internal interface(s) for coupling with user devices 124A, 124B, 172, and 173. Thus, internal module 201 includes converter 202, transmitter 117, receiver 181, as well as wireless interface 118, USB interface 170, and Ethernet port 171. Converter 202 converts between the communication protocol used for communicating payload data between internal module 201 and external module 102 and the communication protocol used for communicating via the short-range or long-range wireless interface 118 and/or one of wired interfaces 170/171.

Together, the external module 102, internal module 103 or 201, and in the example of FIG. 1 router 104, effectively form a bridge system that enables user devices 124A, 124B, 172, and 173 that are otherwise unable to directly couple to wireless communication network 130 to do so.

Figure 3:
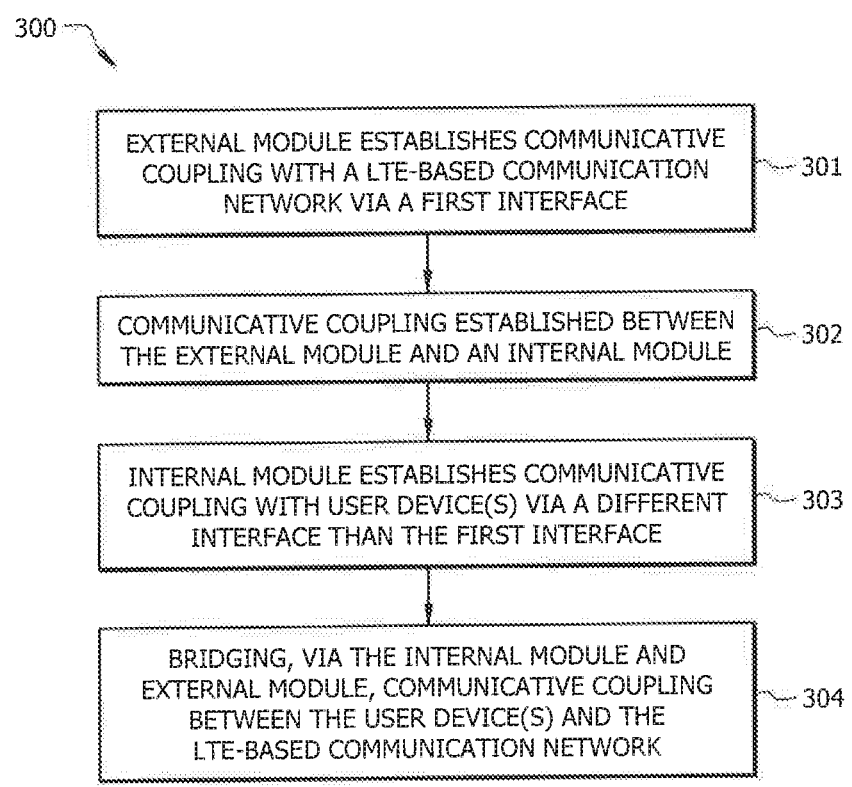
FIG. 3 shows an exemplary operational flow diagram in accordance with an embodiment of the present invention.

FIG. 3 shows an exemplary operational flow diagram for one embodiment, in block 301 external module 102 establishes a communicative coupling with LTE-based communication network 130 via a first interface (e.g., via antenna(s) 106 and receiver 107/transmitter 180). In block 302, a communicative coupling 125 (e.g., wired communicative coupling) is established between the external module 102 and internal module 103/201. In block 303, internal module 103/201 establishes a communicative coupling with the user devices 124A, 124B, 172, and/or 173 via a different interface than the first interface (e.g., via a different air interface 118/123, such as a short-range air interface or different long-range air interface, like 3G in this example, and/or via a wired interface, such as USB 170 or Ethernet 171). In block 304, the internal module 103/201 and external module 102 operate to effectively bridge a communicative coupling between the user device(s) and the LTE-based communication network.

Many of the elements described herein, when implemented via computer-executable instructions, are in essence the software code defining the operations thereof. For instance, the above-described converters 108, 111, 116, and 202 each may comprise computer-executable software code that is stored to a computer-readable medium and is executed by a processor-based computing device for performing the corresponding operations described herein. Further, the various operations described herein, such as those operations described with reference to the exemplary flow of FIG. 3, as well as other operations described herein may be performed by computer-executable software code stored to a computer-readable medium and executing on a processor-based computing device. The executable instructions or software code may be obtained, for example, from a computer-readable medium or "storage device" (e.g., a hard drive media, optical media, EPROM, EEPROM, tape media, cartridge media, flash memory, ROM, memory stick, and/or the like). In certain embodiments, a CPU of a computing system or device may execute the various logical instructions according to embodiments of the present invention. It shall be appreciated that the present invention is not limited to the architecture of the computing system or device on which the various elements are implemented. The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, as examples. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A bridge system for enabling one or more prior generation user devices to dynamically couple with a LTE-based wireless communication network, the bridge system comprising:
    an internal module that when placed within a building is configured for communicatively coupling:
        via a first interface, with an external module external to the building that communicatively couples with the LTE-based wireless communication network, and
        via a second interface, with the one or more prior generation user devices;
    where the internal module, when a signal quality of the LTE-based wireless communication network at a point internal to the building is insufficient for the one or more prior generation user devices to directly couple with the LTE-based wireless communication network, selects:
        using the internal module and the external module to enable communication between the one or more prior generation user devices and the LTE-based wireless communication network, or
        using only the internal module to enable communication between the one or more prior generation user devices and the LTE-based wireless communication network.

2. The bridge system of claim 1 where, if the internal module selects using the internal module and the external module, a LTE based wireless communication is converted to a different protocol and communicated to the one or more prior generation user devices, where the converting comprises:
    converting the LTE-based wireless communication received at the external module to the different protocol; and communicating with the one or more prior generation user devices using the different protocol.

3. The bridge system of claim 1 where the second interface comprises a short-range air interface.

4. The bridge system of claim 1 where the second interface comprises a second long-range air interface.

5. The bridge system of claim 4 where the second long-range air interface comprises 3G communication.

6. The bridge system of claim 1 where the second interface comprises a wired interface.

7. The bridge system of claim 6 where the wired interface comprises at least one of a USB interface and Ethernet interface.

8. The bridge system of claim 1 where the external module is configured to optimize the communicative coupling with the LTE-based wireless communication network.

9. The bridge system of claim 1 where the external module comprises an antenna, receiver, transmitter, wired interface for coupling with the internal module, and converter for converting between the LTE-based wireless communication network and wired communication coupling with the internal module.

10. The bridge system of claim 1 where the first interface comprises a wired interface for coupling with the external module; and
the internal module further comprises a wired interface for coupling with a router device, and a converter for converting between the communication coupling with the external module.

11. The bridge system of claim 10 where the router device is not natively configured to couple to and operate with the LTE-based wireless communication network or the internal module and external module.

12. The bridge system of claim 11 further comprising:
a communication coupling between the internal module and the router device, where the router device provides the second interface for interfacing with the one or more prior generation user devices.

13. The bridge system of claim 1 where the internal module further comprises a power injector for transmitting power to the external module.

14. The bridge system of claim 1 further comprising:
an installation module comprising:
logic to measure a signal quality of the LTE-based wireless communication network at a location internal to the building, and
logic to provide, via a user interface, an indication of signal strength at the location internal to the building and an indication when the signal strength is optimized using only the internal module or both the internal and external modules to bridge the LTE-based wireless communication network.

15. A method for enabling one or more prior generation user devices to dynamically couple with a LTE-based wireless communication network, the method comprising:
establishing, by an internal module within a building, a communicatively coupling:
via a first interface, with an external module external to the building that communicatively couples with the LTE-based wireless communication network, and
via a second interface, with the one or more prior generation user devices;
where the internal module, when a signal quality of the LTE-based wireless communication network at a point internal to the building is insufficient for the one or more prior generation user devices to directly couple with the LTE-based wireless communication network, selects:
using the internal module and the external module to enable communication between the one or more prior generation user devices and the LTE-based wireless communication network, or
using only the internal module to enable communication between the one or more prior generation user devices and the LTE-based wireless communication network.

16. The method of claim 15 where, if the internal module selects using the internal module and the external module, a LTE based wireless communication is converted to a different protocol and communicated to the one or more prior generation user devices, where the converting comprises:
converting the LTE-based wireless communication received at the external module to the different protocol; and
communicating with the one or more prior generation user devices using the different protocol.

17. The method of claim 15 where the second interface comprises a short-range air interface.

18. The method of claim 15 where the second interface comprises a wired interface.

19. The method of claim 18 where the wired interface comprises at least one of a USB interface and Ethernet interface.

20. The method of claim 15 where the external module comprises an antenna, receiver, transmitter, wired interface for coupling with the internal module, and converter for converting between the LTE-based wireless communication network and wired communication coupling with the internal module.

21. The method of claim 15 where the first interface comprises a wired interface for coupling with the external module; and
the internal module further comprises a wired interface for coupling with a router device, and a converter for converting between the communication coupling with the external module.

22. The method of claim 21 where the router device is not natively configured to couple to and operate with the LTE-based wireless communication network or the internal module and external module.

23. The method of claim 15 where the internal module further comprises a power injector for transmitting power to the external module.

24. The method of claim 15 further comprising:
utilizing an installation module comprising:
logic to measure a signal quality of the LTE-based wireless communication network at a location internal to the building, and
logic to provide, via a user interface, an indication of signal strength at the location internal to the building and an indication when the signal strength is optimized using only the internal module or both the internal and external modules to bridge the LTE-based wireless communication network.

* * * * *